(No Model.)
J. CAMPBELL.
PROCESS OF SMELTING REFRACTORY ORES.
No. 290,629. Patented Dec. 18, 1883.
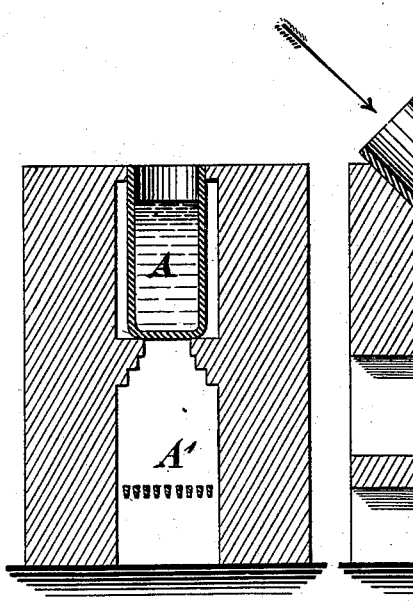
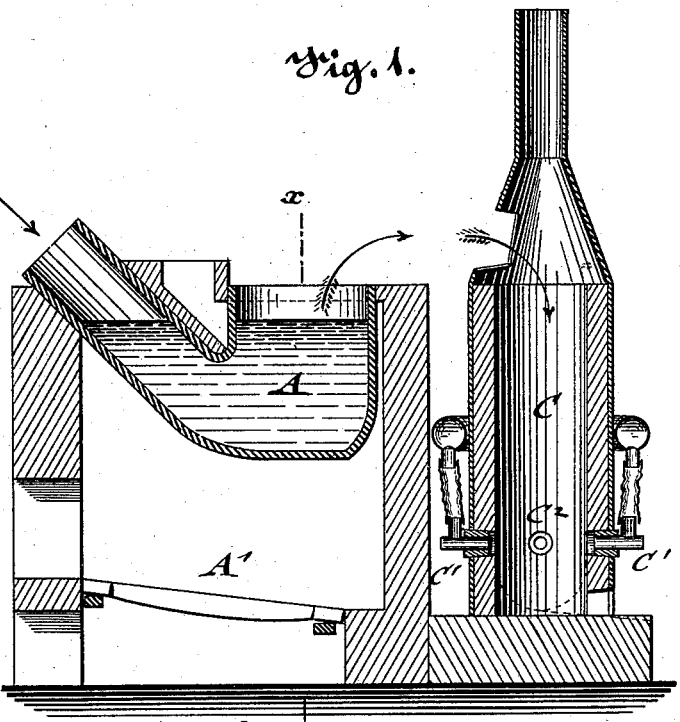
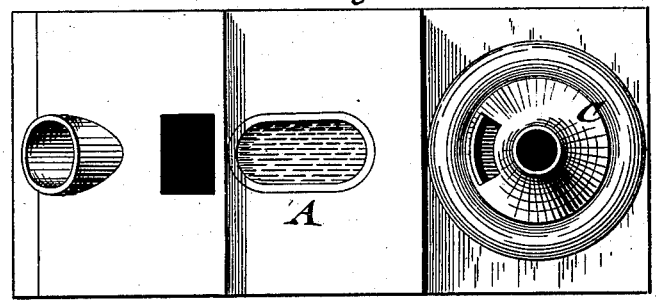
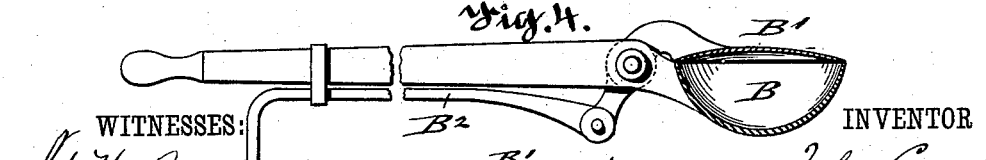
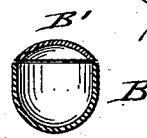
WITNESSES:
INVENTOR
BY
ATTORNEY

UNITED STATES PATENT OFFICE.

JOHN CAMPBELL, OF SAN FRANCISCO, CALIFORNIA.

PROCESS OF SMELTING REFRACTORY ORES.

SPECIFICATION forming part of Letters Patent No. 290,629, dated December 18, 1883.

Application filed May 22, 1882. Renewed July 12, 1883. (No model.)

*To all whom it may concern:*

Be it known that I, JOHN CAMPBELL, of San Francisco, in the county of San Francisco and State of California, have invented certain new and useful Improvements in Processes of Smelting Refractory Ores, of which the following is a specification.

The invention consists, essentially, in the process, herein described, of subjecting refractory ores containing gold and silver, or either, in a pulverized state to the action of a bath of molten lead, not for the purpose of amalgamating the metals, but of saturating the mass of pulverized ores with the lead, in order to prepare the ores for more rapid and successful smelting in a smelting-furnace. When the ores are of poor quality, the lead containing the metals is run off from the smelting-furnace and returned to the molten bath, where it receives and saturates a fresh supply of ores, after which the whole mass is subjected to the operation of smelting, and the process of saturating and smelting is thus repeated until the lead becomes well charged with the metals, the lead being then separated from the metals present by the operation of cupelling.

In the accompanying drawings, which serve to illustrate the apparatus employed in my improved process for treating refractory ores, Figure 1 represents a vertical longitudinal section through the lead bath and smelting-furnace. Fig. 2 is a vertical transverse section on line $x\,x$ through the lead bath. Fig. 3 is a plan view. Figs. 4 and 5 are a sectional side view and a vertical transverse section of a ladle by which the pulverized ores are introduced into the lead bath.

Similar letters of reference indicate corresponding parts.

My process is adapted for treating refractory ores containing gold and silver, either singly or combined, as the case may be. If the ores contain only gold, together with a small quantity of sulphur and base metals, the ores are first pulverized in the usual manner, and then roasted. They are then passed, by means of a covered handle, B, or other means, into a vessel, A, containing molten lead, said vessel having a narrow neck extending above the body of the vessel, as shown in Fig. 1. The ladle B is provided with a cover, B', applied to a fulcrumed lever that is operated by a lever-handle, B², as shown in Figs. 4 and 5. When the ladle is fully immersed in the molten lead of the vessel A, the cover is opened and the pulverized ore discharged. The necessary quantity of lead is kept in a molten state in the vessel A by a furnace, A', arranged below it, as shown in Fig. 1. The ores thus charged are passed into a smelting-furnace, C, which is arranged close to the lead bath A. The smelting-furnace C is provided at the lower part with tuyeres C' and a slag-hole, C², at about the same level therewith. The lead which has absorbed the precious metals during the process of smelting is run off through a discharge-hole and is then returned to the bath, where it is again mixed with ore. The operation is continued until the molten lead is well charged with the precious metals. The mass is then taken to a cupelling-furnace where the lead is separated from the other metals by the process of cupelling. When the refractory ores contain gold and silver, instead of gold alone, the same process is gone through with, except that cupelling should be more frequent, as the lead will not hold as large percentage of gold and silver as of gold alone. Owing to the affinity of the gold and silver for lead, refractory ores which contain no lead, or which do not contain enough lead to make them good smelting ores, can be treated to greater advantage by thus adding lead to the pulverized ores preparatory to smelting. By this treatment the ores are put in such condition as to be successfully treated in the smelting-furnace, so that nearly all the gold and silver contained therein can be removed without difficulty. As the lead is regained after cupelling and used over and over again, the process is not an expensive one.

Some ores do not require to be passed through the roasting-furnace, but are pulverized and passed directly through the lead bath, and from the same to the smelting-furnace and thence to the cupelling-furnace.

I am aware that the process of amalgamating ores by means of molten lead, and subsequently separating the metals by the process of cupellation is not novel; but I am not aware that the process herein described has ever before been known.

Having thus described my invention, I claim as new and desire to secure by Letters Patent—

1. The process of extracting gold and silver from refractory ores, which consists in intimately mixing the pulverized ore with lead in a lead bath, and then subjecting the ore charged with lead to the smelting operation, substantially as set forth.

2. The process of extracting gold and silver, or either, from refractory ores, consisting in intimately mixing the pulverized ore with lead in a lead bath, then subjecting the ore charged with lead to the smelting operation, then returning the matte of lead containing the precious metal to the bath and mixing a fresh supply of ore therewith, and again subjecting the charged ore to the smelting operation, and repeating said steps of mixing and smelting until the lead contains a sufficient amount of precious metal to warrant the operation of cupellation, substantially as set forth.

In testimony that I claim the foregoing as my invention I have signed my name in presence of two subscribing witnesses.

JOHN CAMPBELL.

Witnesses:
A. WOLF,
L. MONNET.